United States Patent [19]

Merkle

[11] 4,381,899
[45] May 3, 1983

[54] WHEELCHAIR LIFT DEVICE

[75] Inventor: Ralph H. Merkle, Brighton, Mich.

[73] Assignee: General Motors Corporation, Detroit, Mich.

[21] Appl. No.: 277,952

[22] Filed: Jun. 26, 1981

[51] Int. Cl.³ .............................................. B60P 1/44
[52] U.S. Cl. .................................. 414/556; 414/921; 187/9 R
[58] Field of Search ............... 187/9 R, 8.61, 8.71; 414/546, 556, DIG. 921

[56] References Cited

U.S. PATENT DOCUMENTS 2,456,805 12/1948 Wohlforth ........................ 414/556
4,124,097 11/1978 Hawkes et al. .................... 187/9 R
4,124,099 11/1978 Dudynskyj ........................ 187/9 R
4,219,104 8/1980 MacLeod .......................... 187/9 R
4,285,416 8/1981 Dudynskyj ........................ 187/9 R Primary Examiner—Joseph J. Rolla
Assistant Examiner—Russell D. Stormer
Attorney, Agent, or Firm—Edward J. Biskup

[57] ABSTRACT

A wheelchair lift device located in a bus stepwell that includes foldable hinged sections normally positioned through a first linkage to form a step with a riser and in which the first linkage operates during deployment to control forward swinging movement of the sections to form a platform for supporting a wheelchair that can be lowered to ground level by a second linkage.

2 Claims, 4 Drawing Figures

WHEELCHAIR LIFT DEVICE

This invention concerns a wheelchair lift device for vehicles such as buses and, more particularly, a wheelchair lift device which provides steps that can be converted into a flat horizontal platform for supporting a wheelchair.

One form of wheelchair lift device presently being used in buses can be seen in U.S. Pat. No. 4,124,097 which issued on Nov. 7, 1978 in the names of Hawks et al and is assigned to the assignee of this invention. The wheelchair lift device seen in the Hawks et al patent is located in a stepwell and includes a vertically movable carriage supporting a pair of hinged base or subframe sections which, together with pivotally interconnected and movable riser and step members, normally form a two-step stairway to allow able-bodied persons to board and exit the bus in the usual manner. When desired, however, the Hawks et al device can be transformed into a substantially flat platform by deploying the subframe sections outwardly relative to the stepwell. During deployment both the movable riser member and the movable step member fold downwardly into the associated subframe sections and, together with the latter, are positioned side by side to form the support surface of the platform which can be lowered to ground level by lowering the carriage so as to accommodate a person confined to a wheelchair.

The present invention is directed to a wheelchair lift device of the type described above, but differs therefrom in that a single-step stairway is provided which comprises a tread section, a riser section, and a floor section—all of which are pivotally interconnected and adapted to be moved from a step-forming position wherein only the floor section is horizontally aligned with the floor portion of the bus, to a platform configuration wherein the tread section and the riser section are also horizontally aligned with the floor portion. The conversion of the wheelchair lift device from the step-forming position to the platform configuration—as well as movement of the platform to ground level, is accomplished in accordance with the present invention by a pair of parallelogram linkage systems combined with a carriage in a manner which allows the tread section to swing upwardly into alignment with the floor portion to form the platform and subsequently permits the tread section and the floor section to swing downwardly to position the platform at ground level.

The objects of the present invention are: to provide a new and improved wheelchair lift device which utilizes a pair of parallelogram linkage systems for converting a single-step stairway to a platform and for lowering the platform from a first position wherein the platform is horizontally aligned with the vehicle floor to a second position wherein the platform is located at ground level; to provide a new and improved wheelchair lift device that can be located in the stepwell of a bus and that includes a pair of hinged sections which normal form a step-and-riser combination and are movable about a first horizontal axis outwardly relative to the stepwell to form a flat platform for supporting a wheelchair, after which the platform is movable about a second horizontal axis to ground level; to provide a new and improved wheelchair lift device for the stepwell of a bus that has a pair of linkage systems, one of which provides for initially swinging a pair of hinged sections from a step-forming position to a platform-forming position, after which the other linkage system provides for swinging the platform to ground level; and to provide a new and improved wheelchair lift device that can be located in the stepwell opening of a bus and has sections that are positioned through a first linkage to form a step with a riser in which the linkage operates during deployment to control forward swinging movement of the sections to form a flat support platform for a wheelchair that can be lowered to ground level by a second linkage.

A more complete understanding of the present invention can be derived from the following detailed description, taken in conjunction with the accompanying drawings, in which.

Figure 1:
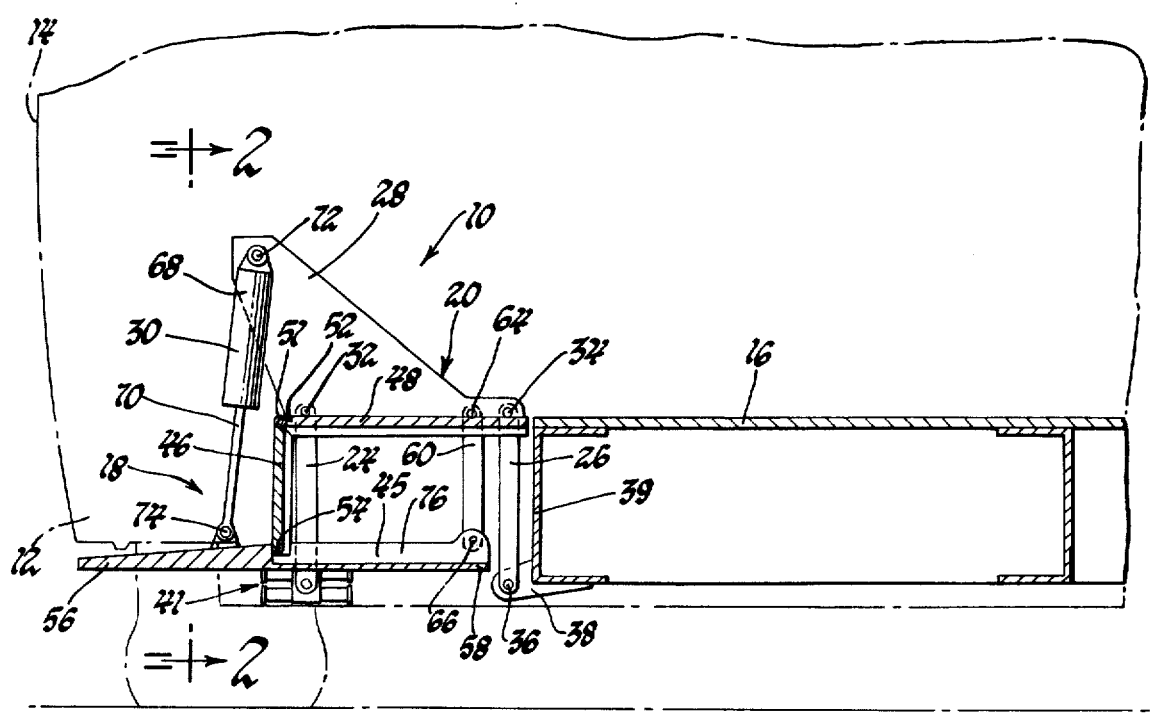
FIG. 1 is an elevational side view showing a wheelchair lift device made in accordance with the present invention and located in the stepwell of a bus while in the step-forming position.
Figure 2:
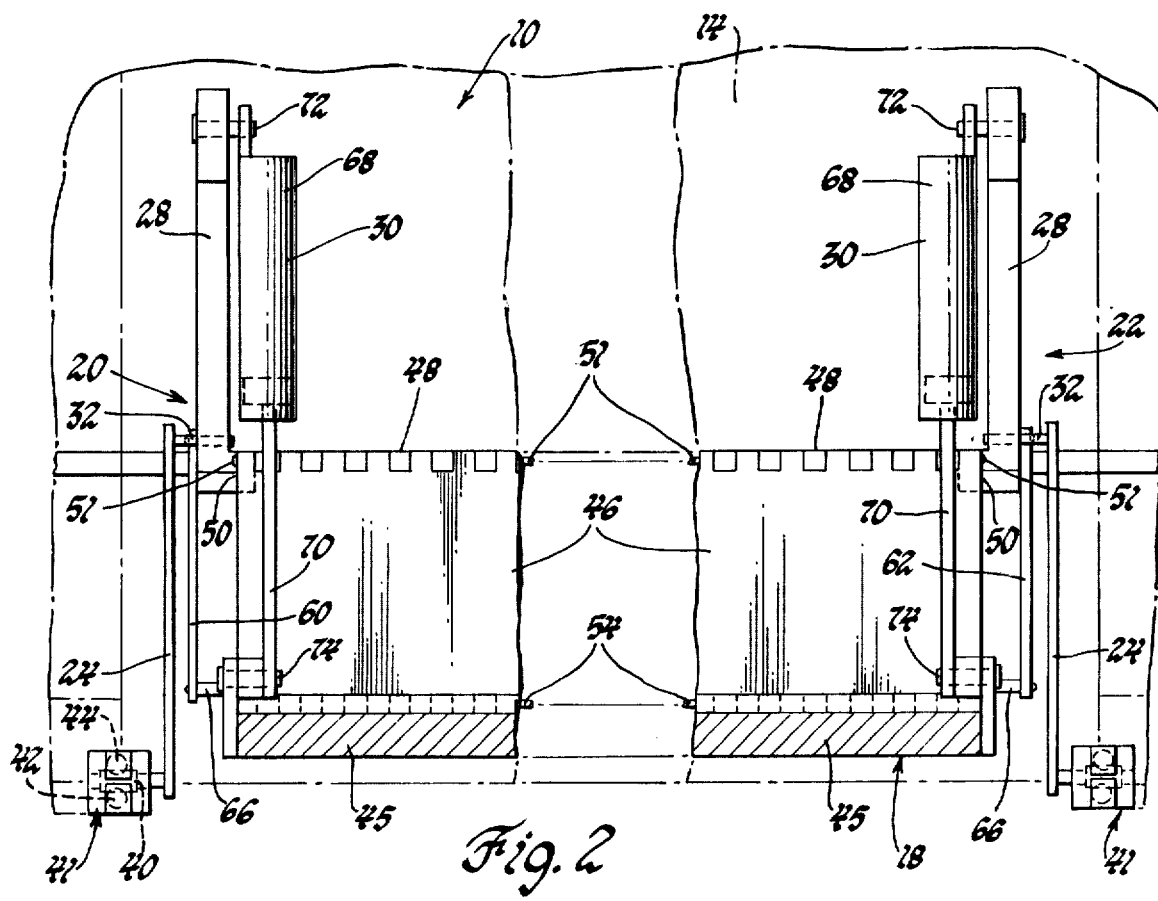
FIG. 2 is an enlarged view of the wheelchair lift device shown in FIG. 1, taken on line 2—2 thereof.

Referring to the drawings and more particularly FIGS. 1 and 2 thereof, a wheelchair lift device 10 made in accordance with the present invention is shown positioned within the stepwell 12 of a motor vehicle 14, such as a coach or bus of the type used in mass public transit, and having the usual floor 16 which is at an elevation substantially above ground level. As will be more apparent as the description of the invention proceeds, the wheelchair lift device 10 includes a step-platform assembly indicated generally by the reference numeral 18, that provides a single step in the stepwell 12 of the motor vehicle 14 permitting normal boarding and exit for able-bodied passengers. In addition when desired to accommodate a physically handicapped person confined to a wheelchair, the step-platform assembly 18 can be converted through a first parallelogram linkage (to be described) into a horizontal platform for a wheelchair and, afterwards, can be moved through a second parallelogram linkage (to be described) between an aligned position with the vehicle floor 16 and a ground level position.

More specifically and as best seen in FIG. 2, the wheelchair lift device 10 includes a pair of support assemblies 20 and 22 spaced along an axis parallel to the longitudinal axis of the vehicle 14 and located in the stepwell 12 of the vehicle 14. Each support assembly 20 and 22 includes a pair of parallel link members 24 and 26, a carriage 28, and a hydraulic lift cylinder 30. As best seen in FIG. 1, the upper ends of the link members 24 and 26 are connected by respective pivot connections 32 and 34 to the carriage 28. The lower end of the link member 26 is connected by a pivot connection 36 to a bracket 38 secured to the frame 39 of the motor vehicle 14; while the lower end of the link member 24 is secured to a pinion 40 which forms a part of a conventional rotary actuator 41, mounted on the motor vehicle 14 and including fluid-operated rack members 42 and 44. Rotary actuators of this type are manufactured by Flo-Tork, Inc., of Orrville, Ohio. In this case, the rotary actuator 41 serves to rotate the link member 24 in a counterclockwise direction from the position shown in FIG. 3 to the position shown in FIG. 4. Such counterclockwise movement causes the step-platform assembly—after it is deployed and assumes the platform configuration—to be moved as a unit from an elevated position to a ground level position, as will hereinafter be more fully explained.

As seen in FIGS. 1 and 2, the step-platform assembly 18 is in the step-forming position and includes a tread section 45, a riser section 46, and a floor section 48—all of which extend between the support assemblies 20 and 22. Each side edge 50 of the floor section 48 is secured to the carriage 28 of the associated support assembly 20,22; thus, in effect, the carriages 28 of the support assemblies 20 and 22 are interconnected by the floor section 48 to form a rigid U-shaped frame member. The upper edge of the riser section 46 is connected by a pivot connection 51 to the front end 52 of the floor section 48; while the lower edge of the riser section 46 is connected by a pivot connection 54 to the tread section 45, intermediate the front end 56 and rear end 58 thereof.

As seen in FIG. 2, the step-platform assembly 18 also includes a pair of identical link members 60 and 62 located at opposite sides of the tread section 45. The upper end of each link member 60 and 62 is connected by a pivot connection 64 to the carriage 28, while each lower end is connected by a pivot connection 66 to the rear end 58 of the tread section 45. As will be more apparent as the description of the invention proceeds, the link members 60 and 62 cooperate with the riser section 46 for guiding the tread section 45 into horizontal alignment with the floor section 48 when the step-platform assembly 18 is deployed.

Figure 3:
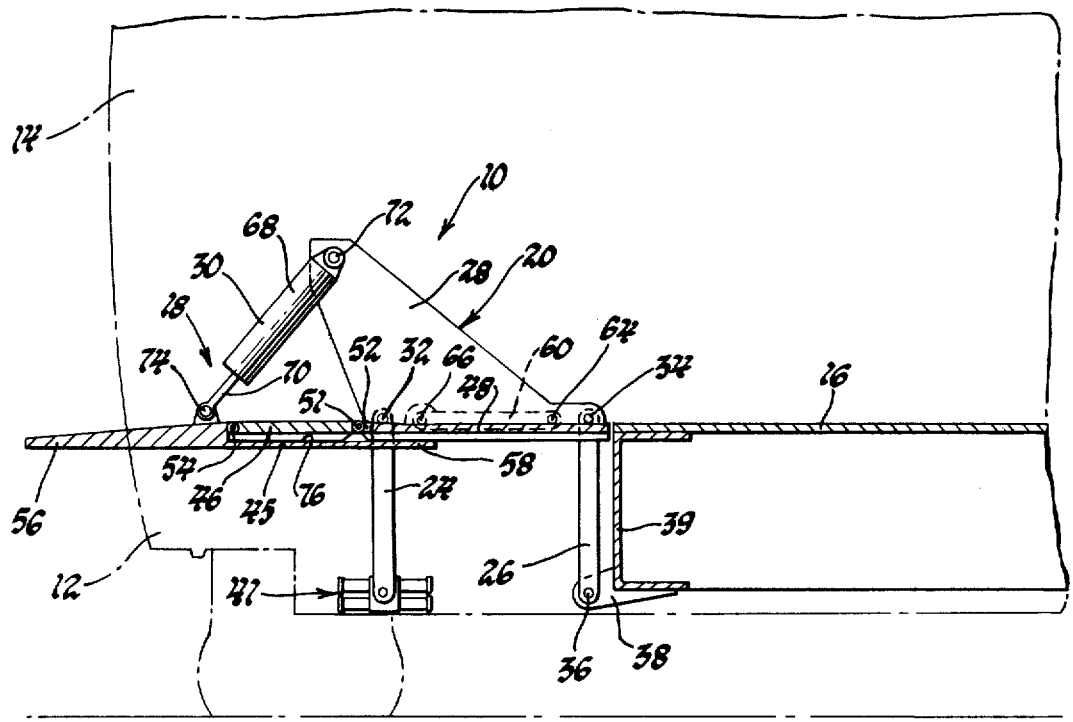
FIG. 3 is a view similar to FIG. 1, with the wheelchair lift device completely deployed and forming a horizontal platform in line with the floor of the bus.
Figure 4:
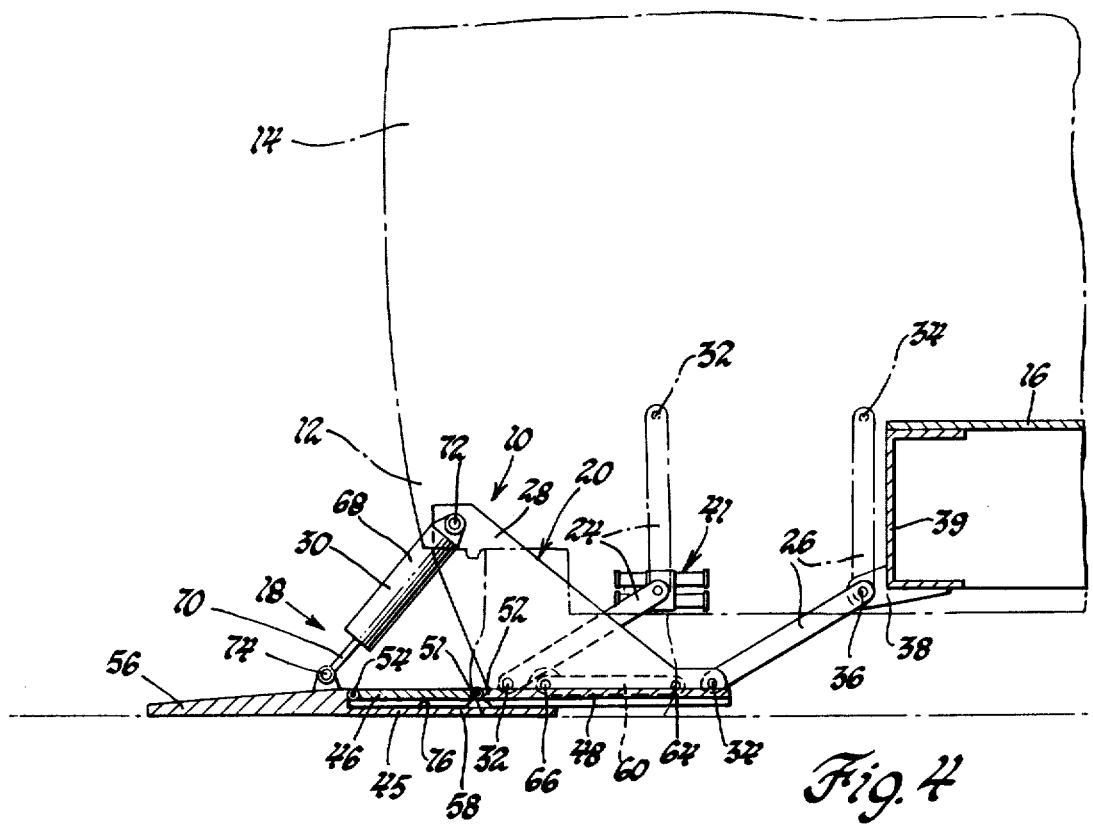
FIG. 4 is a view similar to FIG. 1, but shows the wheelchair lift device in the lowered ground level position.

Deployment of the step-platform assembly 18 to the platform position of FIG. 3 is accomplished through the hydraulic lift cylinder 30 carried by the carriage 28 of each support assembly 20 and 22. In this regard, it will be noted that each hydraulic lift cylinder 30 consists of a cylinder member 68 and a relatively reciprocating piston member 70, with the base portion of the cylinder member 68 being connected by a pivot connection 72 to the carriage 28. The piston member 70 of each hydraulic lift cylinder 30 is connected by a pivot connection 74 to the tread section 45 intermediate the respective front and rear ends 56 and 58 thereof.

From the above description it should be apparent that when the wheelchair lift device 10 has the parts thereof located in the step-forming position of FIGS. 1 and 2, the floor section 48 is horizontally aligned with the floor portion 16, and the tread section 45 and riser section 46 are respectively located in substantially horizontal and vertical positions so as to thereby define the riser and tread portions of one step. Thus, an able-bodied person can board the motor vehicle 14 by first stepping onto the step portion at the front end 56 of the tread section 45, and then onto the floor section 48 of the motor vehicle 14. However, if a physically handicapped person in a wheelchair should wish to gain entry into the motor vehicle 14, the vehicle operator will then actuate a control valve of a suitable hydraulic control system (not shown) that will direct pressurized fluid to the piston rod-end while venting the base-end of the hydraulic lift cylinder 30. This causes contraction of the hydraulic lift cylinder 30 by having the piston member 70 drawn into the cylinder member 68, with resultant forward swinging movement of the tread section 45 under the guiding control of the riser section 46 and link members 60 and 62. As the tread section 45 swings upwardly and outwardly relative to the stepwell 12, the riser section 46 pivots in a clockwise direction about the pivot connection 51, and each link member 60 and 62 pivots in a clockwise direction about its pivot connection 64. The riser section 46 and the link members 60 and 62 continue to guide the tread section 45 as it swings upwardly until it is horizontally aligned with the floor section 48 and assumes the platform position seen in FIG. 3. At this point, the riser section 46 is folded into a well 76 formed in the tread section 45 (as seen in FIG. 1) and assumes a stored position therein. Thus, when the step-platform assembly 18 is fully deployed (as seen in FIG. 3), a horizontal platform is formed that is comprised of the tread section 45, the riser section 46, and the floor section 48.

After the step-platform assembly 18 is in the fully deployed position of FIG. 3, the vehicle operator—through appropriate movement of the aforementioned control valve—will cause the opposite ends of each rotary actuator to be pressurized. As a result, the pinion 40 of each actuator 41 is driven in a counterclockwise direction and causes the link member 24 to rotate in a corresponding direction about the center of the pinion 40. As a result, the carriage 28 swings downwardly under the control of the link members 24 and 26, and the step-platform assembly 18 is lowered from the elevated floor level position of FIG. 3 to the ground level position shown in FIG. 4. The wheelchair can then be rolled onto the formed platform and locked in a stationary position. The operation of the rotary actuator 41 is then reversed, causing the pinion 40 and the link member 24 to rotate in a clockwise direction and resulting in the carriage 28 and the step-platform assembly 18 to be returned to the FIG. 3 position wherein the step-platform assembly 18 is once again horizontally aligned with the vehicle floor 16. The wheelchair is thereafter unlocked and rolled onto the vehicle floor 16 after which pressurized fluid is directed to the base-end of the hydraulic lift cylinder 30, causing the tread section 45 and the riser section 46 to swing in counterclockwise directions so as to return the various parts of the step-platform assembly 18 to the position of FIG. 1 wherein the step is formed for normal usage.

Various changes and modifications can be made in this construction without departing from the spirit of the invention. Such changes and modifications are contemplated by the inventor, and he does not wish to be limited except by the scope of the appended claims.

The embodiments of the invention for which an exclusive property or privilege is claimed are defined as follows:

1. A wheelchair lift device having a foldable platform assembly located in the stepwell of a motor vehicle for raising and lowering a wheelchair between a first position wherein said platform assembly is in horizontal alignment with an elevated floor portion formed within said motor vehicle and a second position wherein said platform assembly is at ground level; said platform assembly comprising a tread section, a riser section, and a floor section, all of which are pivotally interconnected and adapted to be moved from a step-forming position wherein said floor section is horizontally aligned with said floor portion and said riser section is angularly disposed relative to said tread section and said floor section to a load-supporting position wherein said tread section and said riser section are horizontally aligned with said floor section; a support assembly for said platform assembly, said support assembly including a carriage to which the opposite side edges of said floor section are rigidly connected; a first vertically orientated link member located at each side edge of said floor section and having its upper end pivotally connected to said carriage and its lower end pivotally connected to said tread section, said first link member cooperating with said riser section for maintaining said platform assembly in said step-forming position; second and third vertically orientated link members located along each side of said platform assembly and having their upper ends pivotally connected to said carriage and their lower ends pivotally connected to said motor vehicle; a first actuator carried by said carriage and operatively connected to said tread section for swinging said tread section and said riser section into horizontal alignment with said floor section under the control of said first link member; and a second actuator carried by said motor vehicle and operatively connected to said second link member for swinging said platform assembly from said first position to said second position under the control of said second and third link members.

2. A wheelchair lift device having a foldable platform assembly located in the stepwell of a motor vehicle for raising and lowering a wheelchair between a first position wherein said platform assembly is in horizontal alignment with an elevated floor portion formed within said motor vehicle and a second position wherein said platform assembly is at ground level; said platform assembly comprising a tread section, a riser section, and a floor section, all of which are pivotally interconnected and adapted to be moved from a step-forming position wherein said floor section is horizontally aligned with said floor portion and said riser section is angularly disposed relative to said tread section and said floor section to a load-supporting position wherein said tread section and said riser section are horizontally aligned with said floor section; a support assembly for said platform assembly, said support assembly including a carriage to which the opposite side edges of said floor section are rigidly connected; a first vertically orientated link member located at each side edge of said floor section and having its upper end pivotally connected to said carriage and its lower end pivotally connected to the rear end of said tread section, said first link member cooperating with said riser section for maintaining said platform assembly in said step-forming position; second and third vertically orientated link members located along each side of said platform assembly and having their upper ends pivotally connected to said carriage and their lower ends pivotally connected to said motor vehicle; a first actuator pivotally connected at one end to said carriage and pivotally connected at its other end to said tread section forwardly of said riser section for swinging said tread section and said riser section outwardly relative to said stepwell into horizontal alignment with said floor section under the control of said first link member; and a second actuator carried by said motor vehicle and operatively connected to said second link member for swinging said carriage together with said platform assembly outwardly relative to said stepwell from said first position to said second position under the control of said second and third link members.

* * * * *